(12) United States Patent
Rodriguez et al.

(10) Patent No.: US 7,158,948 B1
(45) Date of Patent: Jan. 2, 2007

(54) METHOD AND APPARATUS FOR ENCODING TRANSACTIONS FOR GOODS AND SERVICES USING AN E-RECEIPT

(75) Inventors: Herman Rodriguez, Austin, TX (US); Newton James Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/329,461

(22) Filed: Jun. 10, 1999

(51) Int. Cl.
*G06Q 10/00* (2006.01)

(52) U.S. Cl. .......................... 705/28; 705/27; 705/26; 705/29; 705/22

(58) Field of Classification Search .................. 705/71, 705/65, 76, 75, 26–29, 22; 713/100, 180; 235/380
See application file for complete search history.

(56) References Cited

U.S. PATENT DOCUMENTS

| | | | |
|---|---|---|---|
| 5,239,166 A | 8/1993 | Graves | 235/380 |
| 5,428,210 A | 6/1995 | Nair et al. | 235/375 |
| 5,448,044 A | 9/1995 | Price et al. | 235/380 |
| 5,457,305 A | 10/1995 | Akel et al. | 235/379 |
| 5,479,530 A | 12/1995 | Nair et al. | 382/119 |
| 5,561,282 A | 10/1996 | Price et al. | 235/380 |
| 5,595,264 A * | 1/1997 | Trotta, Jr. | 186/56 |
| 5,638,519 A * | 6/1997 | Haluska | 705/28 |
| 5,739,512 A | 4/1998 | Tognazzini | 235/380 |
| 5,793,302 A * | 8/1998 | Stambler | 340/5.86 |
| 5,809,144 A | 9/1998 | Sirbu et al. | 380/25 |
| 5,838,812 A * | 11/1998 | Pare, Jr. et al. | 382/115 |
| 5,850,442 A | 12/1998 | Muftic | 380/21 |
| 5,870,723 A | 2/1999 | Pare, Jr. et al. | 705/26 |
| 5,892,824 A * | 4/1999 | Beatson | 713/186 |
| 5,936,541 A * | 8/1999 | Stambler | 705/75 |
| 5,974,148 A * | 10/1999 | Stambler | 705/75 |
| 6,032,857 A * | 3/2000 | Kitagawa et al. | 235/379 |
| 6,047,273 A * | 4/2000 | Vaghi | 705/410 |
| 6,209,095 B1 * | 3/2001 | Anderson et al. | 705/67 |

FOREIGN PATENT DOCUMENTS

DE 296 13 393 * 1/1998

(Continued)

OTHER PUBLICATIONS

Business Wire—Aug. 26, 1998, Verisign and Gemplus expand strategic relationship to develop joint smart-card for secure network application.*

(Continued)

*Primary Examiner*—Cuong Nguyen
(74) *Attorney, Agent, or Firm*—Duke W. Yee; Jeffrey S. LaBaw; Betty Formby (57) ABSTRACT

A method and apparatus for encoding transactions for goods and services using an e-receipt is provided. A consumer and a merchant conduct a commercial transaction using a distributed data processing system. An electronic receipt is recorded on a removable storage medium at a first data processing system. The electronic receipt contains data concerning the commercial transaction. The removable storage medium is then read at a second data processing system. After validating the electronic receipt, another commercial transaction or another stage of the original commercial transaction may be performed. The electronic receipt may be validated for a warranty claim on goods or services subject to the purchase transaction, and the removable storage medium may be an optical card or a smart card, either of which is able to store thousands of e-receipts and other electronic documents related to a commercial transaction, with the integrity of each guaranteed through digital signature, digital certificate, etc.

4 Claims, 5 Drawing Sheets

FOREIGN PATENT DOCUMENTS

| | | | |
|---|---|---|---|
| EP | 0793 186 A | * | 9/1997 |
| JP | 08-202774 | | 8/1996 |
| JP | 10-162066 | | 6/1998 |

OTHER PUBLICATIONS

IBM Technical Disclosure Bulletin, "Magnetic Media Receipt Function" vol. 32, No. 11, Apr. 1990, pp. 373-374.*

Unknown, RPK Security selected to provide encryption solution for electronic payment systems and smart card readers, Business Wire, Feb. 11, 1999.*

Greg Mechbach, Digital signature reaches new level—Bank of Nova Scotia uses Entrust Technologies' public key infrastructure software—Jun. 22, 1998.*

Unknown, Transaction completion code based on digital signatures, IBM TDB, Aug. 1985, vol. 28, No. 3, pp. 1109-1122.*

International Business Machines; Transaction Completion Code Based On Digital Signatures; Aug. 1985; pp. 1109-1122; vol. 28, No. 3; IBM Technical Disclosure Bulletin.

International Business Machines; Real Time Transaction Capture Using Smart Cards; Jun. 1992; pp. 242-243; vol. 35, No. 1B; IBM Technical Disclosure Bulletin.

International Business Machines; Credit Card Imaging System; Nov. 1991; pp. 152-153; vol. 34, No. 6; IBM Technical Disclosure Bulletin.

Contents and Delivery Certification Service Using Cryptography In Electronic Mail; Tanaka et al.

A First For Electronic Signature Capture: Long Island Retailer Announces Chainwide Installation; Fox, B.; Chain Store Age Executive, vol. 69, No. 5, pp. 151, May 1993.

* cited by examiner

METHOD AND APPARATUS FOR ENCODING TRANSACTIONS FOR GOODS AND SERVICES USING AN E-RECEIPT

CROSS-REFERENCE TO RELATED APPLICATIONS

The present invention is related to application entitled "OPTICAL TRANSACTION CARD", Ser. No. 09/213,912, filed Dec. 17, 1998, assigned to the same assignee, and incorporated herein by reference.

BACKGROUND OF THE INVENTION

1. Technical Field

The present invention relates generally to an improved data processing system and, in particular, to an improved method and apparatus for processing electronic documents used in a commercial transaction.

2. Description of Related Art

A common occurrence in everyday life is the issuance and acceptance of a paper receipt as evidence of a commercial transaction. Such receipts include vouchers, sales slips, signed notices, paid bills, proofs of payment, statements, sales tickets, admittance, and cash register tapes. These items are used almost everywhere to provide a consumer and a merchant with some means of recording a commercial transaction to ensure that rights and responsibilities regarding the commercial transaction are honored between the parties through the transaction.

Currently, consumers and merchants use paper receipts that must be retained not only until the purchase value has been received by the customer but also for future problems regarding claims and responsibilities with regards to the commercial transaction. For the consumer, maintaining many receipts over a period of time may be difficult. For the merchant, the issuance of a paper receipt almost guarantees that the merchant must create and maintain other paper records that match the paper receipt.

For example, in a typical purchasing transaction, a consumer may travel to a home supply store to buy building materials. After paying for some merchandise, the consumer will receive a paper receipt as proof of purchase. If the consumer has purchased some bulky items, such as lumber, the consumer may be required to proceed to a different location to pick up the lumber, such as a loading dock at the back of the store or at a nearby lumber yard. The consumer's purchase receipt serves as evidence of payment for the lumber and of the right to delivery of the lumber from an agent of the home supply store. Once the consumer has tendered the receipt, the agent may physically mark the paper receipt to show that the lumber has been delivered, and the lumber is given to the consumer.

The use of paper receipts in this situation creates some minor inconveniences. The consumer must ensure that the paper receipt is not lost before the lumber is picked up, which is usually not difficult as the lumber would probably be picked up in a short amount of time. However, the consumer is required to keep the receipt in case the consumer desires to return any defective merchandise. As some stores may allow the return of certain merchandise after several months, the consumer may need to file the paper receipt in a special place to ensure that it is not lost.

The merchant also confronts some inconveniences. The home supply store's purchase transaction system may update inventory records immediately upon the sale of the merchandise, even though not all of the merchandise has been removed from the stock. If the purchase transaction system is set up so that a lumber yard manager must enter a transaction into an electronic terminal to update the inventory records, and the lumber yard manager fails to do so, then the inventory records will not properly match the actual inventory.

As is familiar to most consumers, the maintenance and transfer of paper receipts for such purposes may be both cumbersome and annoying. Therefore, it would be useful to have a method and apparatus for electronically transferring proofs of purchase or other documents related to commercial transactions. It would be further advantageous to have a method and apparatus for transferring and storing detailed information concerning the status and details of a particular commercial transaction. It would be particularly advantageous to have a method and system for processing this information using physical media that is inexpensive, convenient, and durable.

SUMMARY OF THE INVENTION

The present invention provides a method and apparatus for encoding transactions for goods and services using an electronic receipt or e-receipt. A consumer and a merchant conduct a commercial transaction using a distributed data processing system. An electronic receipt is recorded on a removable storage medium at a first data processing system. The electronic receipt contains data concerning the commercial transaction. The removable storage medium is then read at a second data processing system. After validating the electronic receipt, another commercial transaction or another stage of the original commercial transaction may be performed. The electronic receipt may be validated for a warranty claim on goods or services subject to the purchase transaction, and the removable storage medium may be an optical card or a smart card, either of which is able to store thousands of e-receipts and other electronic documents related to commercial transactions, with the integrity of each guaranteed through digital signature, digital certificate, etc.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
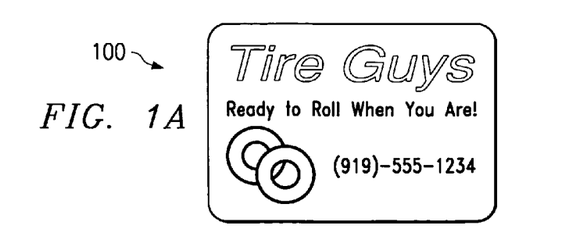
FIGS. 1A–1B is a graphical depiction of a safe card implemented as an optical card that may be used in conjunction with the present invention.
Figure 1B:
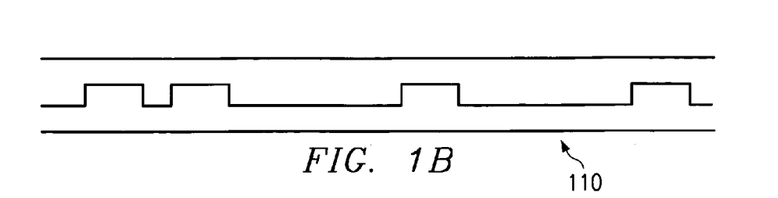

With reference now to FIGS. 1A–1B, a graphical depiction is provided for a safe card implemented as an optical card that may be used in conjunction with the present invention. FIG. 1A shows optical card 100, which is similar to optically readable CD-ROMs that are used for distributing music. One side of the card is printed with information while the other side has a transparent coating protecting a layer of readable bits. Optical card 100 is about the same size as a credit card. FIG. 1B shows a cross-sectional, magnified, not-to-scale view of an optical card with an encoded surface that may be read as a binary series of ones and zeroes by an optical laser as is well-known in the art.

A safe card is a writable/readable media whose integrity is assured through a digital signature, digital certificate, etc. The safe card, when implemented as an optical card, contains a large amount of storage capacity that may be written once and read many times. To read and write to the safe card, the safe card may be swiped through a read/write machine by a manual action. As will be described in further detail below, the owner of the safe card may perform this action twice in a typical purchase transaction. The first swipe writes an electronic receipt (or e-receipt) on the safe card, and the second swipe reads the electronic receipt when presenting the safe card to the merchant for delivery of goods or services that were recently purchased. Alternatively, a safe card may also be inserted into an optical card machine in a manner similar to inserting an automated teller machine (ATM) card into an ATM, in which case the optical card machine may hold the card until the end of the transaction. As another alternative embodiment, the functionality of a safe card may be combined with the functionality of a credit card or an ATM card on a single computer-readable medium. This type of multi-purpose card may provide the user with the convenience of carrying fewer cards.

A laser initially scans the information present on the optical card. The operator of the optical card machine may input a command that causes information to be stored on the card. An amount of data can be written onto an unused portion of the card, after which the information may be read many times. Once a specific portion of the optical card has been used, it may not be reused to store other useful information. However, an optical card machine may write over a previously used portion of the card in order to destroy the previously stored information.

A safe card may store information regarding particular purchases made by the owner of the safe card and recorded as electronic receipts, or e-receipts, on the safe card by a merchant. After a consumer has purchased a product or service, the consumer has the option to receive a paper receipt providing proof of the commercial transaction, but in accordance with the present invention, the consumer may either solely or optionally present a safe card to the merchant so that the merchant may electronically record the purchase on the safe card.

A major advantage of using optical cards as safe cards for storing e-receipts is that optical cards are inexpensive. Typically, they cost only a few cents to manufacture. Hence, merchants may give away safe cards to their customers as a value-added convenience for their customers.

Over a long period of time, a user may repeatedly present a safe card to a series of merchants, and the memory on the safe card gradually fills with electronic documents from the merchants. Because a safe card may hold many megabytes of information and the electronic documents may be only as large as a few kilobytes of information, a safe card may provide enough storage capacity for several years of purchases. If the safe card is implemented as an optical card, the safe card may be durable enough to provide years of use without problems.

Figure 2A:
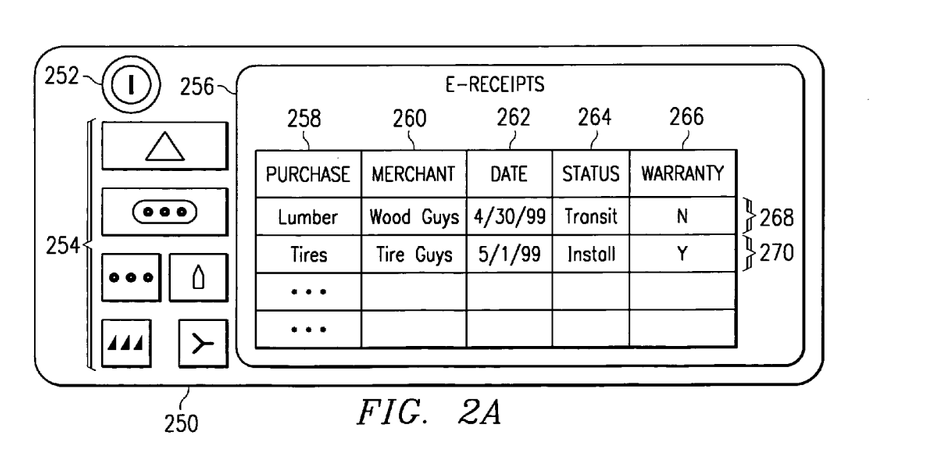
FIG. 2A is a graphical depiction of a safe card implemented as a smart card.

With reference now to FIG. 2A, a graphical depiction is provided for a safe card implemented as a smart card that may be used in conjunction with the present invention. Although a smart card provides additional functionality that can not be provided by an optical card, a smart card has inherent disadvantages compared to an optical card. Smart cards are more expensive to produce, which may limit the willingness of merchants to provide smart cards as free safe cards to customers or the willingness of customers to purchase smart cards as convenient safe cards for storing e-receipts. Smart cards are also more fragile than an optical card, which may be exposed to magnetic fields, etc. without harming the optical card.

Smart card 250 includes power switch 252, input control buttons 254, and electronic display 256. Buttons 254 may be used by a purchaser or owner of the smart card for inputting and selecting specific functions provided by an application operating on the smart card. Display 256 presents information to the user of the smart card generated by applications within the smart card. In the provided example, an e-receipt application is executing on the smart card providing the safe card functions.

Display 256 presents information regarding particular purchases made by the user of the safe card and recorded as e-receipts on the safe card. Display 256 shows categories of information from the e-receipt application regarding purchase information 258, merchant information 260, dates 262, associated receipt information 264, and warranty information 266. Each of these categories contains information displayed in a column fashion that may be sorted by column so that the purchaser may have access to e-receipts recorded from the safe card.

Purchase information 258 displays individual items that have been purchased by the user of the safe card over a particular period of time. The e-receipt application on the smart card may provide the user with the ability to selectively edit and delete purchase information stored on the smart card. Merchant information 260 shows the merchants or vendors from which purchases have been made. The e-receipt application on smart card 250 may contain an associated merchant database that provides more detailed information to the user on display 256 as required by the user. Detailed information may include the physical or geographic location of the merchant, merchant contact information, such as the fax number, phone number, web page, etc. Date information 262 shows the date and optionally the time that the purchase occurred.

Receipt information 264 contains information associated with the recording of a particular purchase as an e-receipt on the safe card. For example, this information may provide the user with information concerning the processing status of the purchase, the e-receipt status within the safe card, number of times that the e-receipt has been accessed or used, etc. Warranty information 266 contains information concerning the existence of a warranty on the associated purchase. Other warranty information may be provided, such as the provider of the warranty, the merchant from whom the purchase was made, and a credit card company that provided a credit card transaction for a particular purchase that may provide an additional warranty on the product.

In the examples shown in FIG. 2A, purchase 268 shows that the item that was purchased was an amount of lumber bought at a merchant named "Wood Guys" on a date of April 30. The receipt entry for purchase 268 shows a status of "transit" that may indicate that the lumber is currently in transit to a particular location at which the user had requested the lumber to be delivered. The warranty entry for purchase 268 shows that the user purchased the lumber without a warranty.

Purchase 270 displayed on the safe card shows that the user purchased tires from a merchant named "Tire Guys" on a date of May 1. The receipt information associated with purchase 270 shows that the tires are currently being installed. This may be the case if the user is currently at the merchant having the tires installed on the user's vehicle. The warranty entry associated with purchase 270 shows that the tires were purchased with an included warranty. This indicates that there may be more information available about the warranty stored on the smart card.

Other useful information may be provided to the user by an e-receipt application. For example, the e-receipt application may include maintenance tips or installation guidelines for the user's purchase that were stored on the safe card at the same time that the e-receipt was stored on the safe card. Detailed purchase information concerning the items that were purchased may also be stored on the safe card. In the example provided in FIG. 2A, purchase 268 may include data about the number of board-feet that were purchased, the type of lumber that was purchased, the origin of the lumber, and any associated notes concerning the condition of the lumber. Purchase 270 may include the number of tires that were purchased, the make and model of tires that were purchased, and the date of manufacture for the tires. Each type of purchase may require specific detailed purchase information to be stored along with the e-receipt of that purchase.

Figure 2B:
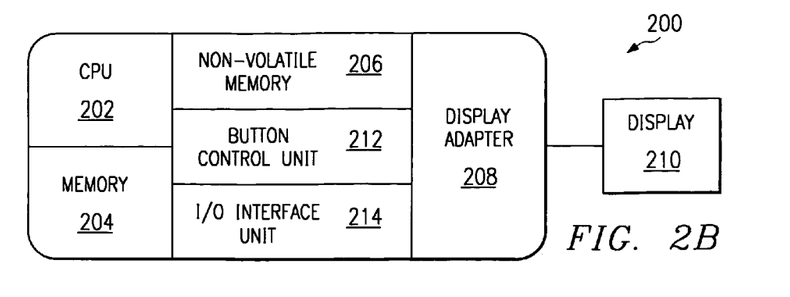
FIG. 2B is a block diagram depicting the hardware components within a safe card implemented as a smart card.

With reference now to FIG. 2B, a block diagram depicts the hardware components within a smart card that may be used to implement the present invention. Safe card 200 contains a CPU 202 that provides processing capabilities to various applications located on safe card 200. Memory 204 provides temporary storage for the loading and processing of applications. Non-volatile memory 206 provides storage for applications and their related databases. Display adapter 208 generates presentation data to be shown on display 210. Button control unit 212 reads and processes user selections of buttons on the physical interface of safe card 200. I/O interface unit 214 allows safe card 200 to interface with various safe card readers, scanners, modems, or other computer or network related items.

Button control unit 212 allows a user to input various selections and data to applications on safe card 200. Additional input devices may be included with or interfaced to safe card 200. Display 210 may be physically integrated with safe card 200, although other display units may be connected to safe card 200. Non-volatile memory 206 may include a variety of storage devices and capabilities, such as read-only memory, flash ROM, or an IBM MicroDrive, a product of International Business Machines Corporation, located in Armonk, N.Y. Safe card 200 may also include a Java Virtual Machine capable of running Java applications and applets. Those of ordinary skill of the art will appreciate that the hardware in FIG. 2B may vary depending on the implementation.

Although the safe cards have been described as being implemented as optical cards and smart cards, other types of recordable media may be used, such as floppy disks, cards with magnetically recordable strips, etc. The present invention should not be interpreted as limited to only the recordable media described above.

Figure 3A:
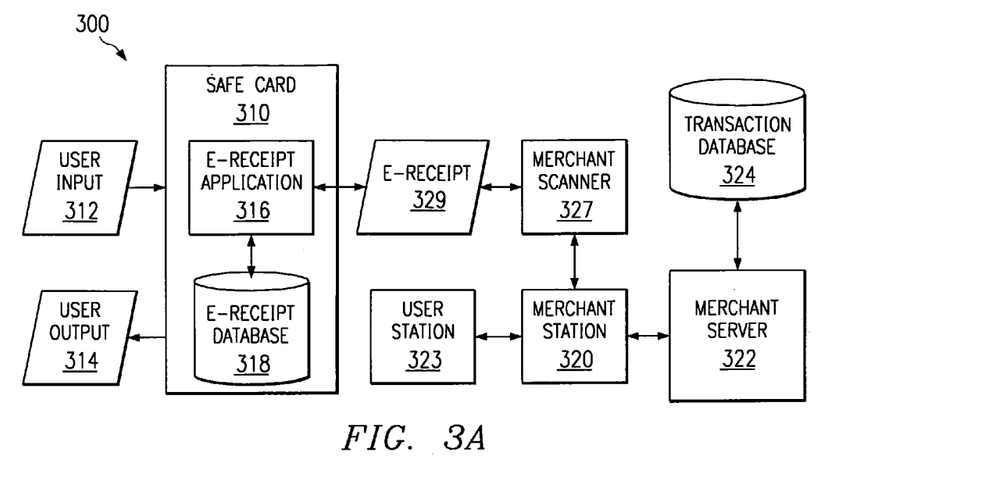
FIG. 3A is a block diagram of a distributed data processing system depicting the use of e-receipts for providing purchase confirmations and other purposes on a safe card implemented as a smart card.

With reference now to FIG. 3A, a distributed data processing system depicts the use of e-receipts for providing purchase confirmations and other purposes on a safe card implemented as a smart card. Safe card 310 may be similar to safe card 200 shown in FIG. 2. A user of safe card 310 is able to provide input to applications on safe card 310 through user input 312. The user receives useful information from safe card 310 through user output 314. Safe card 310 contains e-receipt application 316 that provides functionality for processing e-receipts within data processing system 300. Safe card 310 also has e-receipt database 318 for storing e-receipts in a non-volatile manner.

E-receipt database 318 may include many different types of information associated with e-receipts, such as help files, merchant information, product use, and installation, etc. Safe card 310 receives e-receipt 329 from a merchant system and directs e-receipt 329 to e-receipt application 316. Safe card 310 interfaces with the merchant system through merchant scanner 327. Merchant scanner 327 may be similar to a barcode scanner normally found connected to electronic cash registers. Merchant scanner 327 also may be similar to a smart card reader, or some other type of card reader that may receive and transmit e-receipt 329 and associated information with smart card 310.

Merchant scanner 327 sends and receives information to and from merchant server 322 through merchant station 320. This information may include purchase applications, inventory applications, etc. Merchant station 320 contains an input device, such as a keyboard, and an output device, such as a display, that allows the merchant or merchant's agent to interact with the transaction system. User station 323 contains an input device, such as a keyboard, and an output device, such as a display, that allows a consumer to enter information that may be necessary for using the smart card, such as a Personal Identification Number (PIN), etc. In this manner, the consumer station may resemble systems that are frequently found in supermarket checkout stations. Merchant server 322 reads and writes to transaction database 324, which records information concerning user purchases and claims for products and services from the merchant.

Figure 3B:
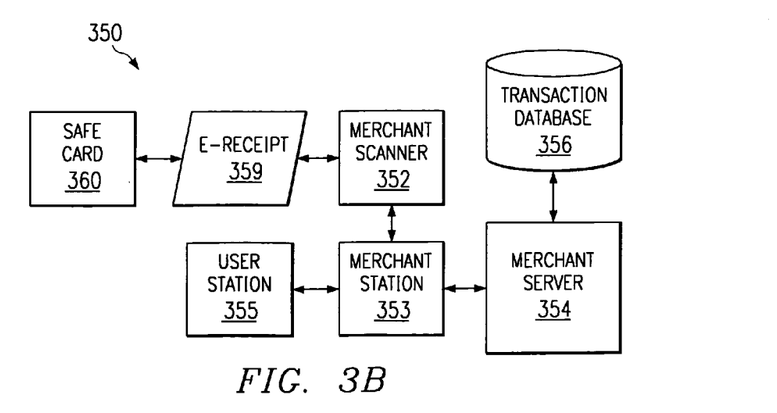
FIG. 3B is a distributed data processing system depicting the use of e-receipts for providing purchase confirmations and other purposes on a safe card implemented as an optical card.

With reference now to FIG. 3B, a distributed data processing system depicts the use of e-receipts for providing purchase confirmations and other purposes on a safe card implemented as an optical card. Safe card 360 may be similar to safe card 100 shown in FIG. 1. Safe card 360 has storage capacity for storing e-receipts and other related information in a non-volatile manner after receiving the e-receipt from data processing system 350.

Safe card 360 may include many different types of information associated with e-receipts, such as help files, merchant information, product use, and installation, etc. Safe card 360 receives e-receipt 359 through merchant scanner 352, which may be similar to a barcode scanner normally found connected to electronic cash registers or to an ATM. Merchant scanner 352 sends and receives information to and from merchant server 354 through merchant station 353. This information may include purchase applications, inventory applications, etc. Merchant station 353 contains an input device, such as a keyboard, and an output device, such as a display, that allows the merchant or merchant's agent to interact with the transaction system. User station 355 contains an input device, such as a keyboard, and an output device, such as a display, that allows a consumer to enter information that may be necessary for using the smart card, such as a Personal Identification Number (PIN), etc. In this manner, the consumer station may resemble systems that are frequently found in supermarket checkout stations. Merchant server 354 reads and writes to transaction database 356, which records information concerning user purchases and claims for products and services from the merchant.

The transmittal of an e-receipt may include a digital signature to ensure that the user of a safe card has been properly identified as a particular customer known or previously identified within the merchant's commercial transaction system. The digital signature may encode the information on the safe card so that only the owner of the safe card, or only the merchant that placed the information on the safe card, may read the particular electronic documents on the safe card. The digital signature also protects the integrity of the document by preventing and/or detecting changes to the e-receipt. The e-receipt may include any additional information required to complete the electronic purchase other than information concerning the product or service being purchased. For example, the e-receipt may include a consumer or purchase identification number, a merchant or vendor identification number, and other information necessary for identifying the particular commercial transaction to distinguish it from other commercial transactions within the merchant system.

As another example, the e-receipt may include the credit card number that was used in the original commercial transaction. Some credit card companies automatically extend the warranty of a product that was purchased with a credit card issued by the credit card company. By storing the credit card number used during the original purchase along with the warranty information for the product recorded in the e-receipt, the user of the safe card has a convenient record of the length of an automatically extended warranty.

Other configurations for data processing systems may be used for writing and reading information to and from safe cards. For example, a handheld portable device may contain a scanner unit through which a safe card may be swiped. A person delivering some type of goods that have been previously purchased could require that a person accepting the delivery must present a safe card with a proper e-receipt. Once the handheld device authenticates the e-receipt, the goods may be delivered, at which point the safe card may be swiped a second time so that the actual delivery of the goods may be recorded onto the safe card. At the same time, the handheld device creates a record that is either stored and later downloaded to the merchant's main system or that is wirelessly transmitted to the merchant's main system so that the main system may update inventory records and reconcile the delivery of the goods with the original purchase transaction.

Figure 4:
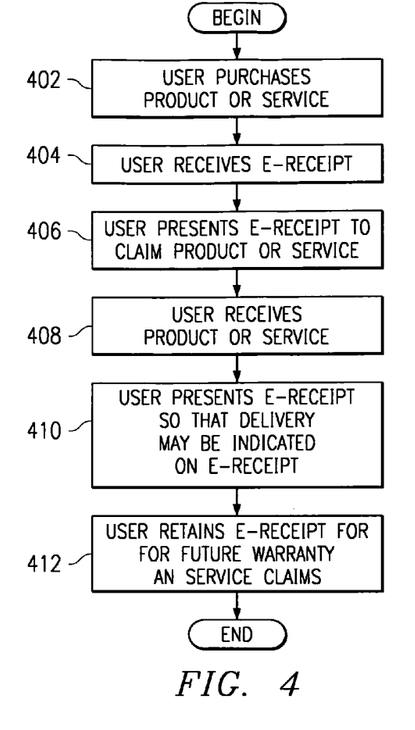
FIG. 4 is a flowchart depicting a user's or purchaser's perspective of the use of an e-receipt during the useful life of an e-receipt.

With reference now to FIG. 4, a flowchart depicts a user's or purchaser's perspective of the use of an e-receipt during the useful life of an e-receipt. The process begins when a user purchases a product or service (step 402). The user receives an e-receipt (step 404) that may be stored by the user on a safe card. The user presents the e-receipt stored on the device to claim a product or service from a merchant (step 406). After the user receives the product or service (step 408), the user presents the e-receipt so that delivery of the product or service may be recorded electronically on the e-receipt (step 410). The user then retains the e-receipt for future service and warranty claims (step 412).

In the two stage process of recording the original receipt and recording the delivery of goods, the merchant's system may operate in any number of alternative, equivalent manners. The merchant system may "mark" an e-receipt for a purchase as having had goods or services delivered in the following manner: the originally recorded receipt is destroyed by overwriting the original binary information; and a new receipt that contains the delivery information in addition to the original purchase information is written onto an unused portion of the safe card. Alternatively, the delivery information is written onto an unused portion of the safe card with a pointer to the original purchase information. As another alternative, the safe card memory is divided into portions available to any merchant. Once a merchant "claims" an area of memory by writing some information, the rest of the area is reserved for that merchant.

The methods of storing information onto a safe card are merely provided as examples and are not meant as limitations for the present invention.

Figure 5:
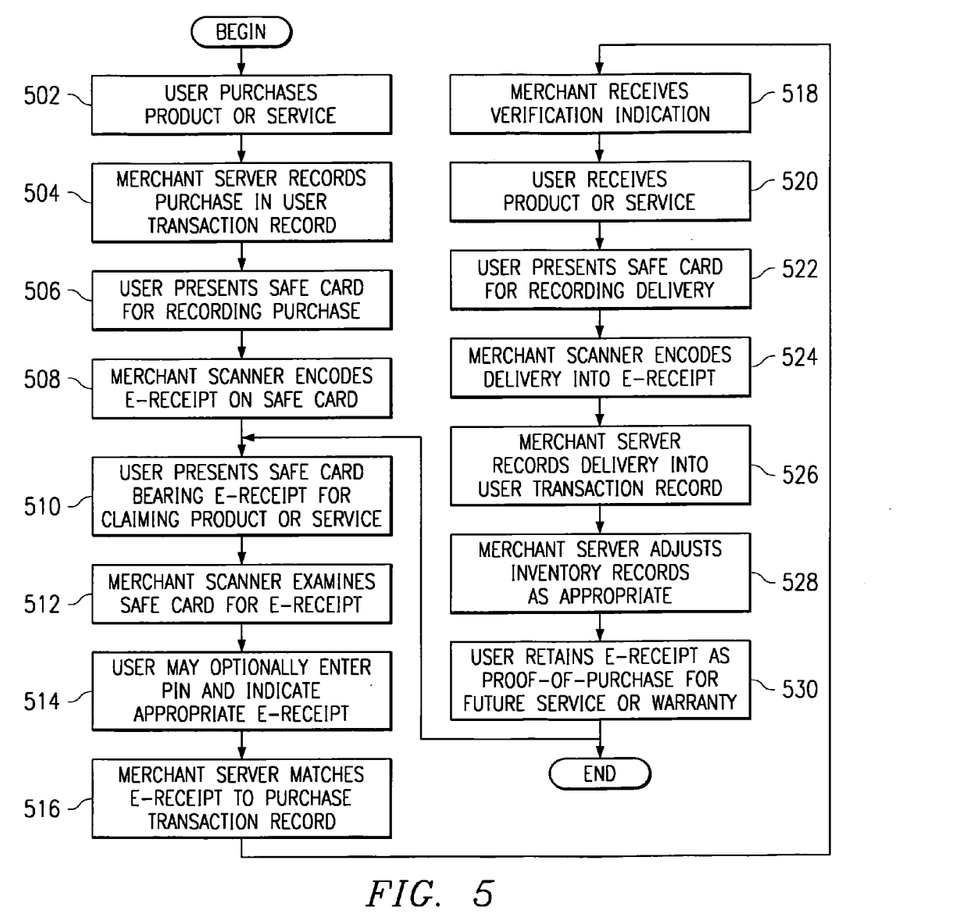
FIG. 5 is a flowchart depicting the detailed processing of an e-receipt within a distributed data processing system.

With reference now to FIG. 5, a flowchart depicts the detailed processing of an e-receipt within a distributed data processing system. The process begins when a user purchases a product or service from a merchant (step 502). The merchant server, in conjunction with an electronic cash register or other purchasing system or software application, records the purchase in a transaction record for the user (step 504). The user then presents a safe card for recording the purchase (step 506). The merchant scanner encodes an e-receipt on the safe card (step 508). This may occur when a user physically swipes the safe card through an electronic scanner or reader specifically adapted for interfacing with the safe card. Alternatively, an ATM-type device could be used where the card is used both for transferring funds electronically and storing transaction records such as e-receipts on the card after receipt from the ATM-type device.

The user presents the safe card bearing the e-receipt for a purchase when claiming the product or service (step 510). At some point in time after completing the purchase transaction, a consumer may need to pickup or receive delivery of a product that could not physically be delivered immediately upon completion of the purchase. For example, in some cases a consumer may be required to travel to another location such as a warehouse in order to receive the product that has been purchased.

In other situations, a user completes a purchase at a cash register location within the merchant's facilities yet must proceed to a delivery counter to pickup a purchased product. In these situations, the method and process of the present invention provides a way for verifying a consumer's claim for product. In the case of purchasing a service, many situations require the closing of a purchased transaction at one location while the service may be delivered at a later time and different location. In those cases, the electronic receipts provided by the present invention may be particularly useful for verifying the user's claim for a service.

The merchant scanner examines the safe card for receipts after the user has presented the safe card to claim a product or service (step 512). It is assumed that the merchant's system may only interpret the e-receipts that have been placed on the safe card by that merchant. Otherwise, the merchant would be able to read the consumer's other e-receipts and obtain information concerning rival merchants from which the consumer has purchased something. Hiding the e-receipts may be accomplished by suitable encryption or encoding of the e-receipt while maintaining a universal directory on the safe card that many different merchant systems may write to and read from. If the merchant chooses to use some type of encryption key, then the merchant may be assured that a decryptable e-receipt on the safe card has been written to the safe card by the merchant and not forged.

In a situation in which the user has many e-receipts concerning a particular product or service, the user may optionally enter a Personal Identification Number (PIN) and indicate the appropriate e-receipt that is to be used for the current delivery of the product or service (step 514). After the merchant scanner has transmitted the e-receipt to the system of the merchant, the merchant server matches the e-receipt to the proper purchase transaction record stored within the transaction database (step 516). The merchant then receives a verification from the merchant server or system (step 518), and the user receives the product or service (step 520). The user then presents the safe card for recording the delivery of the product or service upon the appropriate e-receipt (step 522). The merchant scanner then encodes the delivery into the e-receipt stored on the safe card (step 524). In some cases, an automated machine may hold the consumer's safe card for both the reading of the e-receipt and the recording of the delivery of the product. However, it is contemplated that the safe card remains under the personal control of its owner in a manner similar to handling a credit card. The merchant server also records the delivery of the product or service into the appropriate server transaction record stored in the merchant's database (step 526). The merchant server or system can then adjust the merchant's inventory records as appropriate (step 528). The user then retains the e-receipt as a proof of purchase for future service or warranty as necessary (step 530). At the appropriate time the user may present the safe card with the e-receipt for other deliveries of products or services in accordance with the user's previous purchase.

Figure 6:
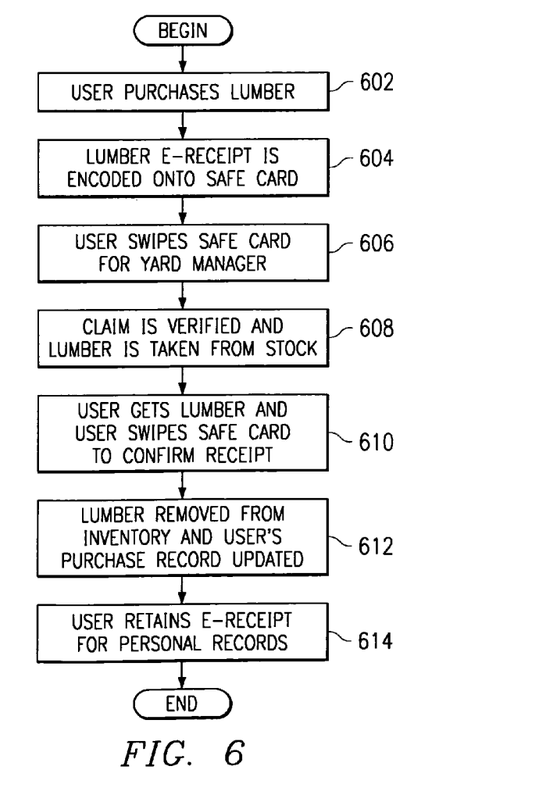
FIG. 6 is a flowchart depicting an example of a particular use of a safe card bearing e-receipts.

With reference now to FIG. 6, a flowchart depicts an example of a particular use of a safe card bearing e-receipts. The process begins when a user purchases a quantity of lumber (step 602). An e-receipt for the lumber purchase is encoded onto the safe card of the purchaser (step 604). At some later point in time, the user swipes the safe card for the lumber yard manager (step 606). The user's claim for a quantity of lumber is verified by the merchant system, and the lumber is taken from the appropriate stock (step 608). The user receives the lumber, and the user then swipes the safe card to confirm the receipt (step 610). The appropriate quantity of lumber is removed from the merchant's inventory, and the user's purchase transaction record is updated to reflect the physical delivery of the lumber (step 612). The user may then retain the e-receipt for personal records (step 614).

Figure 7A:
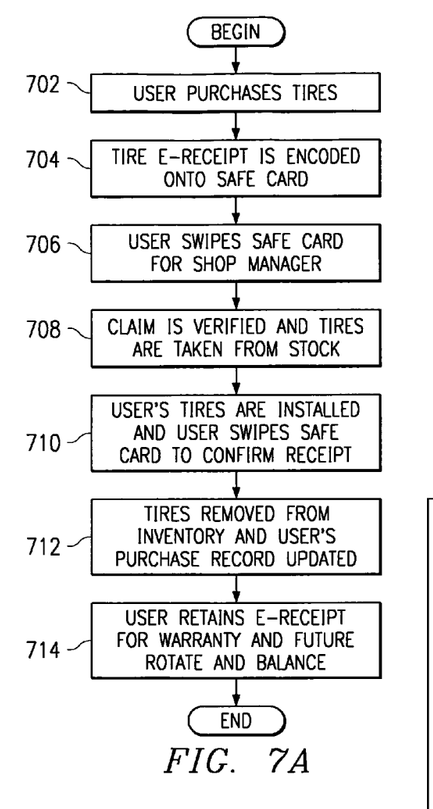
FIGS. 7A and 7B are flowcharts depicting a second example using an e-receipt for a particular purchase.
Figure 7B:
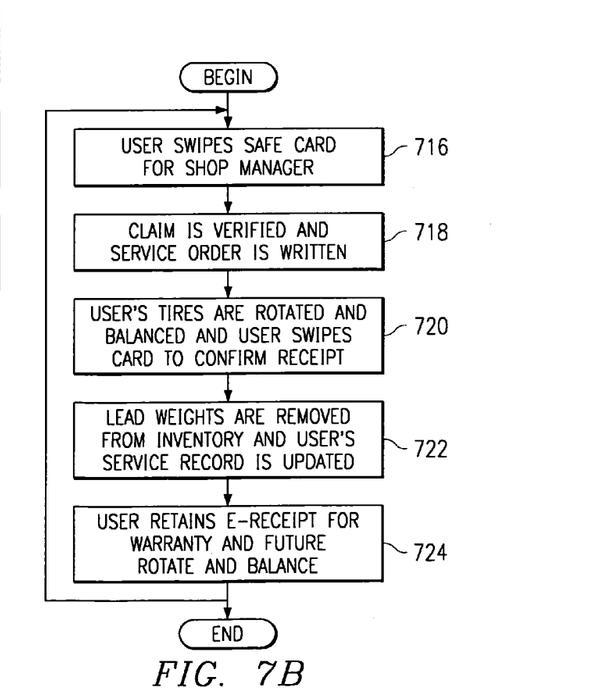

With reference now to FIGS. 7A–7B, flowcharts depict a second example using an e-receipt for a particular purchase. In FIG. 7A, the process begins when a user purchases a set of tires (step 702). An e-receipt for the tire purchase is then encoded onto the safe card of the purchaser (step 704). At some later point in time, the user may desire to receive the tires. Since tires are a bulky item that may require special handling and delivery, the location for receiving the tires may be separated from the location at which the user pays for the purchase of the tires. For example, the user may need to proceed to the rear of a warehouse or to a warehouse at a different location to receive the tires. As another example, the tires may be delivered to the location of the purchase but at a later date.

At some later point in time, the user presents the safe card bearing the e-receipt and swipes the safe card through a safe card reader for a shop manager (step 706). The user's claim for the tires is verified within the merchant's system and the tires are taken from the merchant's stock (step 708). The user's tires are then installed, and the user again swipes the safe card to confirm the receipt of the tires (step 710). The merchant's inventory records are updated to reflect the removal of the tires from the merchant's stock, and the user's purchase record is updated (step 712). The user then retains the e-receipt on the user's safe card for future warranty claims and for potential rotation and balancing services on the recently purchased tires (step 714). At this point, the process ends as the user may not access the e-receipt for a significant period of time.

As shown in FIG. 7B, at some future point in time, the user desires to have the tires rotated and balanced. Upon arrival at the appropriate location, the user swipes the safe card bearing the e-receipt for the originally purchased tires in order to present the user's claim for tire servicing (step 716). The merchant's system verifies the claim and provides an indication that a service order has been authorized for the tire services (step 718). The user's tires are then rotated and balanced, and the user again swipes the safe card to confirm the receipt of the tire services (step 720). The merchant's system may be updated to reflect that lead weights used during the rotation and balance services have been removed from the merchant's inventory, and the merchant's system also updates the user's service record that is associated with the user's original purchase transaction (step 722). The user may then retain the e-receipt for future rotation and balancing requests or other warranty requests associated with the purchased tires (step 724). If the user desires further service, then the process loops back to step 716. FIG. 7B describes an essentially non-terminating loop. However, if the e-receipt is overwritten or the safe card is destroyed, etc., then the process ends.

Although it is assumed that both the merchant and the consumer act honorably and reasonably during the history of any and all purchase transactions, situations may arise in which a safe card does not properly reflect what is stored in the merchant server or what is remembered by either the merchant or the consumer. To prevent these circumstances, an audit trail or transaction log may be stored simultaneously on the merchant server and on the safe card. When the transaction logs fail to match, the burden of correcting any discrepancies may be placed on the merchant because the merchant has the opportunity to encrypt the information on the safe card to prevent tampering with the information on the safe card. The storage of information on the safe card and on the merchant server is also under the control of the merchant, making it rather difficult for the consumer to create false records.

The convenience of the e-receipts provided by the present invention can be contrasted with the inconveniences caused by paper receipts. If one is required to keep all business related receipts for tax purposes during a calendar year, it may be difficult to separate personal expenses from business expenses. With e-receipts, a user of a safe card may input an indicator into the safe card for each particular type of purchase so that the e-receipt application on a safe card may manually sort the different types of expenses.

With paper receipts, one must manually mark the receipts or manually sort the receipts into various record-keeping envelopes. As another example of the inconvenience of a paper receipt, when one is required to return a previously purchased product, one must usually present a paper receipt that proves that one has purchased the product at a particular merchant. In some situations, the merchant desires to keep the paper receipt for the purchase. In other situations, the merchant may physically mark the receipt to show that a product has been returned. However, if the purchase included many different products, then the purchaser may need to use the paper receipt for several different purchased items. If the consumer desires to return only one item out of the many items on the original receipt, there may be several difficulties related to copying the original receipt, marking the original receipt, and insuring that the purchaser maintains a valid receipt for the other items that have been purchased.

Other advantages of the present invention should be apparent in light of the detailed description of the invention provided above. Currently, businesses and users must use paper receipts to provide evidence of purchases for various situations, such as the presentation of a receipt for the delivery of a previously purchased product, the return of merchandise, the presentation of a claim for service on a product that was purchased, a claim for services, and a claim for an ongoing, periodic service contract relationship, the presentation of a warranty request for a product previously purchased, etc. In each of these cases, a consumer must keep track of paper receipts until they are deemed no longer useful.

By storing e-receipts on a safe card, the consumer may conveniently keep all receipts for purchases for particular kinds of expenses or for periodic accounting purposes on a single safe card. Moreover, since safe cards may be manufactured as inexpensive optical cards, merchants may issue store-specific safe cards to each consumer, and a consumer may keep a different safe card for each merchant that the consumer visits on a regular basis.

Each consumer may decide how best to organize different e-receipts on different safe cards. A consumer may decide to keep personal expenses on one card and business-related receipts on another card, or a consumer may decide to keep restaurant e-receipts on one card and all grocery purchases on another safe card.

Besides the conveniences provided by e-receipts over ordinary paper receipts, the process in the present invention for scanning a user's e-receipt safe card provides a more secure method for ensuring that the product or service that has been purchased is delivered to the properly identified purchaser. The merchant also receives the benefit of being able to accurately track inventory at the time that the product or service is actually delivered.

As a further example, when a consumer visits a movie theater, the consumer purchases a movie ticket. The movie ticket provides the dual purpose of a receipt for the purchase and a token for physical admittance to the theater. Usually, half a paper ticket is surrendered to gain admittance to the theater. This allows the theater owner to track how many persons have entered a theater for a particular movie showing, and it also allows the theater owner to mark the movie ticket in a manner that shows that the ticket has been used and a service delivered. However, if a theater owner desires to know the actual occupancy of a theater after the tickets to a particular movie showing have been sold, the theater owner must manually count the tickets that have been redeemed for a particular showing, or the theater owner must manually count the number of empty seats that remain in a theater. If the particular movie showing is interrupted, a theater owner may issue "rain checks" to allow the movie patrons to return for another showing of the movie so that the theater owner delivers the service that has been purchased by the movie patrons. In that situation, the movie patrons surrender the remaining portion of the movie ticket receipt and receive another ticket or rain check as a paper receipt for evidence for a future claim for a movie showing.

With a safe card, the following scenario may be realized which provides numerous advantages. A consumer purchases an admittance to a theater to watch a movie. The consumer either presents a safe card at the box office so that a movie ticket e-receipt may be placed on the safe card by swiping the safe card and encoding a movie ticket onto the safe card, or the theater issues the consumer a safe card with a movie ticket e-receipt encoded on the safe card. When the movie theater patron wants to enter the theater, the patron swipes the safe card to gain entrance to the theater, and the theater owner simultaneously knows that one seat in the theater has been occupied. If the movie is interrupted, then a patron presents the safe card containing the movie ticket e-receipt. The safe card is swiped so that a rain check may be encoded onto the safe card that allows the patron to return at some time in the future and gain admittance to another movie showing at no charge. The patron presents the safe card with the rain check and swipes the card to gain entrance to the theater. The theater owner can then keep a running total of how many patrons returned to redeem their rain checks and whether the patrons desired to see the same movie that was originally interrupted.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for maintaining inventory records of products being sold, the method comprising the computer-implemented steps of:

provide inventory records corresponding to a plurality of products for sale;

processing a purchase transaction for a first product of said plurality of products;

generating an electronic receipt comprising data concerning the purchase transaction;

using a first read/write device to write said electronic receipt to a removable storage medium;

using a second read/write device that is different from said first read/write device to read said electronic receipt from said removable storage medium;

validating said electronic receipt; and in response to validating said electronic receipt,
providing an indication to proceed with a delivery of said first product and updating an inventory record corresponding to said first product to reflect the delivery of said first product.

2. The method of claim 1 wherein said step of validating said electronic receipt further comprises inspecting a digital signature to verify the integrity of said electronic receipt.

3. A computer program product in a computer-readable medium for maintaining inventory records for a plurality of items for sale, the computer program product comprising:

first instructions for processing a purchase transaction;

second instructions for generating an electronic receipt comprising data concerning the purchase transaction;

third instructions for storing said electronic receipt on a removable storage medium;

fourth instructions for reading said electronic receipt on the removable storage medium;

fifth instructions for validating said electronic receipt; and sixth instructions for providing an indication to proceed with a delivery of said first item in response to validating said electronic receipt, seventh instructions for updating an inventory record corresponding to said first item in response to validating the electronic receipt.

4. The computer program product of claim 3 wherein said instructions for validating the electronic receipt further comprise instructions for inspecting a digital signature to verify the integrity of said electronic receipt.

* * * * *